Inventor
KONRAD BEYERLE
By
Attorneys

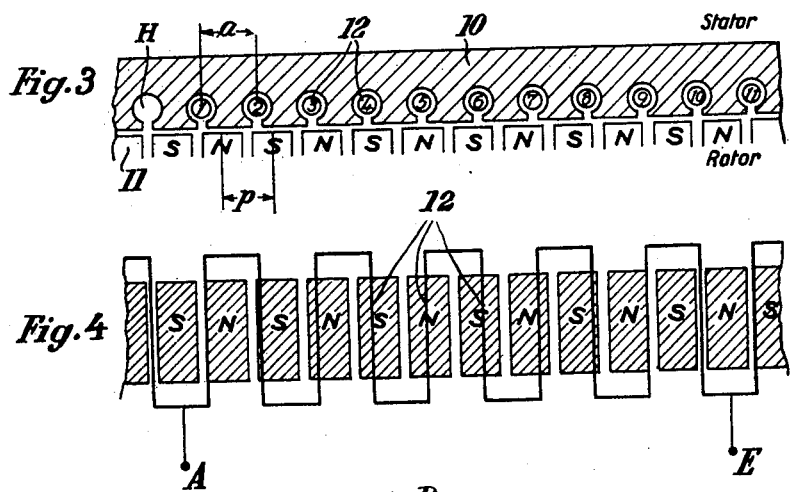
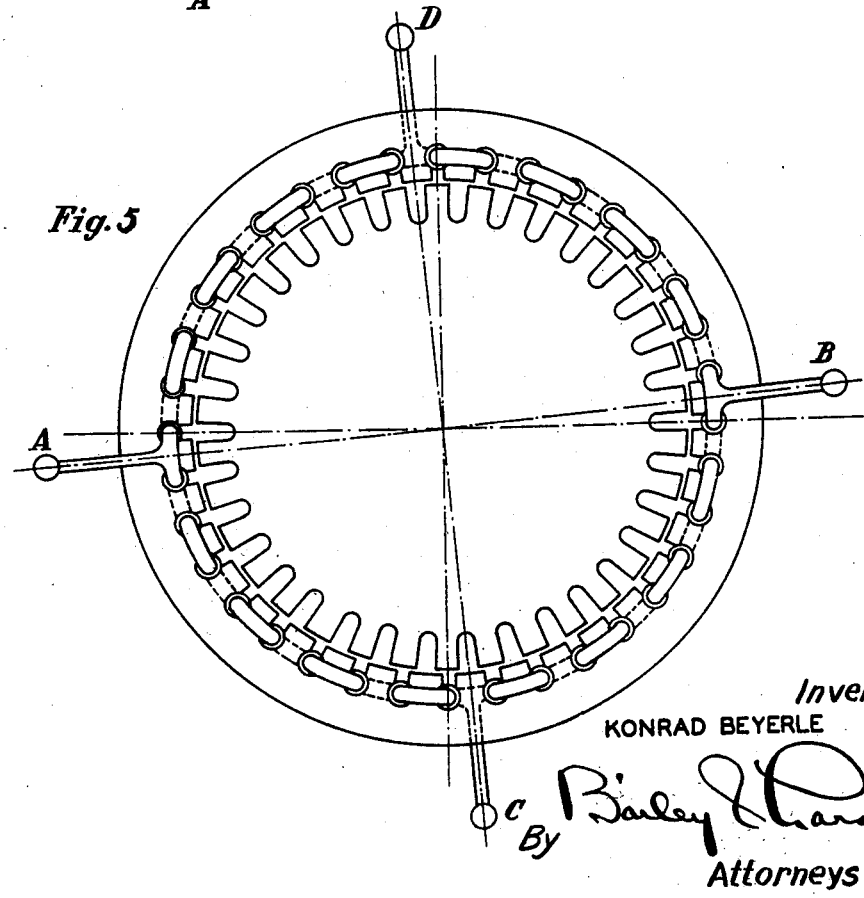

May 9, 1939.   K. BEYERLE   2,157,094
SYSTEM FOR THE ELECTRICAL TRANSFER OF ROTARY MOTION
Filed July 27, 1938   5 Sheets-Sheet 4

Inventor
KONRAD BEYERLE

By
Attorneys

May 9, 1939. K. BEYERLE 2,157,094
SYSTEM FOR THE ELECTRICAL TRANSFER OF ROTARY MOTION
Filed July 27, 1938 5 Sheets-Sheet 5

Inventor
KONRAD BEYERLE
By
Attorneys

Patented May 9, 1939

2,157,094

UNITED STATES PATENT OFFICE 2,157,094

SYSTEM FOR THE ELECTRICAL TRANSFER OF ROTARY MOTION

Konrad Beyerle, Kiel-Neumuhlen, Germany, assignor to Anschütz & Co. G. m. b. H., Kiel-Neumuhlen, Germany Application July 27, 1938, Serial No. 221,641
In Germany March 20, 1936

8 Claims. (Cl. 172—239)

My invention relates to a system for the transfer of rotary motion.

Systems of this type comprise a sender and a receiver both of the rotatable transformer type each composed of a stator and a rotor. The sender and the receiver are so connected by electrical conduits and are so energized that at the receiving station a voltage is induced which controls a servomotor, if necessary through an amplifier, whereby the servomotor develops a torque reproducing the rotary motion prescribed by the sender.

The object of my invention is an improved system of this kind which is simple in design and reliable in operation and is capable of very accurately reproducing the prescribed rotary motion at a considerable energy without being subject to undesired hunting effects.

In my improved system the electric servomotor is directly connected with the receiver rotor, and sender and receiver constitute an electrical speed change transmission in which a partial revolution of the sender causes the receiver to perform one complete revolution. Owing to this arrangement the tendency of the receiver to start an oscillatory hunting motion is substantially reduced.

My invention is based on the discovery that in known systems of the above described type in which a mechanical speed reduction gear is interposed between the servomotor and the receiver, the latter rotating at the same speed as the sender, the unavoidable elasticity or flexibility of this reduction gear and the lost motion therein are the main cause of the observed tendency to initiate a hunting motion. Therefore, I prefer to provide a rigid connection between the electric motor and the rotary sender element whereby these causes of a hunting motion are eliminated.

Another object of my invention is to provide an improved sender ensuring strict proportionality between the angular motions of the sender and of the receiver even though both constitute a speed change transmission in which a turn of the sender through a small angle causes the receiver to turn through a large angle or even through one or more complete revolutions.

Another object is to provide a sender having a multiplicity of pairs of poles which is compact and simple in structure in order to impose as small a load as possible on the device controlling it which may be a gyroscopic instrument.

My invention will be described hereinafter with reference to the drawings.

Fig. 3 shows a cross-sectional development of part of the rotor and of the stator of my improved sender, the stator being provided with a polyphase winding.

Fig. 4 is a diagrammatical plan view of the sender illustrated in Fig. 1, the poles and the winding elements being shown therein.

Fig. 5 is a side view of a sender constructed in accordance with the diagrams of Figs. 3 and 4 being provided with a two-phase single-notch winding, the rotor being illustrated diagrammatically, the winding thereof being omitted.

Figure 1:
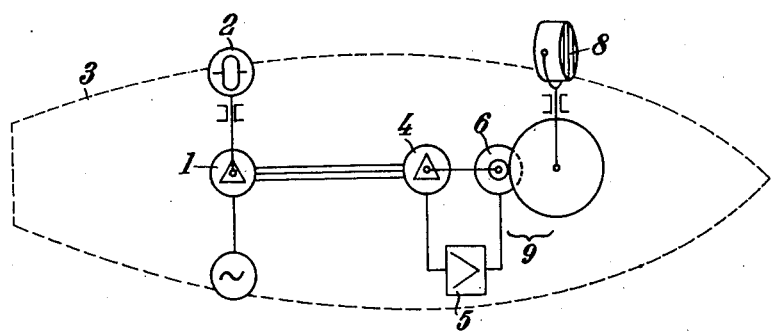
Fig. 1 is a representation of the remote control of a search light for the purpose of stabilizing the same within the azimuth, this representation serving to explain the problem to be solved by the invention.

The search light 8 mounted on the vessel 3 to be pivotal about a vertical axis, shall be stabilized within the azimuth under remote control from a gyroscopic instrument 2 which is likewise pivotal about a vertical axis and maintains its position relative to the meridian. The remote control of the comparatively heavy body 8 is effected by an electromagnetical system adapted to transmit the relative rotary motion from the gyroscopic instrument 2 to the search light 8. This electromagnetical system comprises a sender and a receiver interconnected by electrical conduits.

The sender is of the rotary transformer type the primary winding of which is energized by monophase alternating current whereas its polyphase secondary winding is connected by the electrical conduit to a similar winding of the receiver 4. The rotor 1 of the sender is directly connected with the vertical shaft of the gyroscopic instrument 2 and, in the present embodiment, the rotor winding constitutes the primary transformer element fed by a source of monophase alternating current. In both, the sender and the receiver, the polyphase winding is preferably carried by the stator. The rotor of the receiver is drivingly connected with the vertical shaft of the search light 8.

The flux set up by the primary winding induces in the polyphase winding of the sender a secondary voltage producing equalizing currents between the sender 1 and the receiver 4. In the receiver, these currents set up an alternating field which partakes in all rotary motions performed by the rotor of the sender. This secondary alternating field is operative, in the monophase winding of the rotor of the receiver 4, to induce a voltage which is fed to the input circuit of an amplifier 5 through collector brushes. The output circuit of the amplifier is connected to an electrical motor 6, more particularly, to the armature thereof. This motor is clutched to the receiver and is adapted to rotate the search light 8 through a gear 9 of any desired ratio of transmission. This arrangement is so provided that the motor 6 always tends to restore the rotor of the receiver 4 to the angular position in which the voltage induced in the winding of the rotor becomes zero. This is the position in which the plane of the rotor winding of the receiver is positioned in the direction of the secondary flux field.

Whenever the secondary alternating field transmitted from the sender rotates on account of a rotary adjustment of the sender rotor, a voltage is induced in the winding of the rotor of the receiver 4 causing the rotor to be rotated by the motor 6 in a sense decreasing this voltage. The elements 4, 5 and 6 thus constitute an electromechanical restoring cycle whereby the rotor of the receiver 4 is always caused to follow the rotary motions of the secondary field, and, therefore, of the sender 1.

In the example described, the relative motions of the gyroscopic instrument 2 and of the vessel 3 are transmitted to the heavy body 8, without causing any reaction on the instrument, whereby this heavy body is kept in the same direction as the gyroscope frame.

It is necessary that the vertical shaft of the search light 8 have a smaller rotary speed than the electric motor, for instance, a maximum speed of two or three revolutions per minute. For this reason, the speed reducing gear 9 is interposed between the electric motor 6 and the search light 8.

In the systems common prior to my invention, the receiver 4 was directly connected with the search light 8 and the reduction gear was interposed between the receiver motor 4 and the motor 6. With such arrangement, however, the restoring cycle 4, 5, 6 constitutes a mechanism automatically producing oscillations if the reduction gear has any, even though a limited, lost motion. This fact may be explained as follows: The instantaneous amount of the angular movement described by the receiver 4 lags in time after that described by the motor 6 by the lost motion. As the torque produced by the motor is proportional to the voltage induced in, and therefore proportional to the angle of rotation of, the rotor relative to the secondary field in the receiver 4—as long as the angles under consideration are small—this torque lags in time after the movement of the motor. The motor torque which fluctuates nearly harmonically, when the receiver starts to oscillate or "hunt", may be regarded under these circumstances as being composed of a component having the same phase as the angle of rotation of the motor, and of a component lagging in time after this angle a quarter of an oscillation. The amplitude of the hunting motion of the receiver so produced is considerably larger than the lost motion in the gear 9. Even though the last-mentioned component of the motor torque may be small compared with the first component, it will yet always constitute a positive product when multiplied with the momentaneous value of the motor speed. This product represents the energy maintaining the hunting operation.

The development of a receiving system of the above described kind capable of adjusting itself to the prescribed position without oscillatory motion is, in the first line, conditional upon the elimination of the source of energy producing hunting.

As a mechanical gear free from any lost motion does not exist, I have eliminated the gear 9 from the restoring cycle altogether. To this end, a rigid direct connection with the search light 8 of both, the receiver rotor and the armature of the electric motor, could come into consideration. Such a design would require the use of a motor, however, capable of revolving at extremely low speed. Motors of this type have a poor efficiency and a high weight and require a large space. Therefore, I connect the servomotor 6 directly with the rotor of the receiver 4 and reorganize sender and receiver in such a way that they constitute an electric speed change transmission in which a partial revolution of the sender causes the receiver to perform one complete revolution. Hence, the rotor of the receiver 4 is directly clutched to the servomotor 6 and is indirectly connected with the vertical shaft of the search light 8 through the gear transmission 9. Another transmission, the ratio of which corresponds to the ratio of the gearing 9, is electrically constituted by the sender 1 and the receiver 4. In this way, I may clutch the sender 1 directly to the gyroscopic instrument 2 and the receiver directly to the electric motor.

Figure 2:
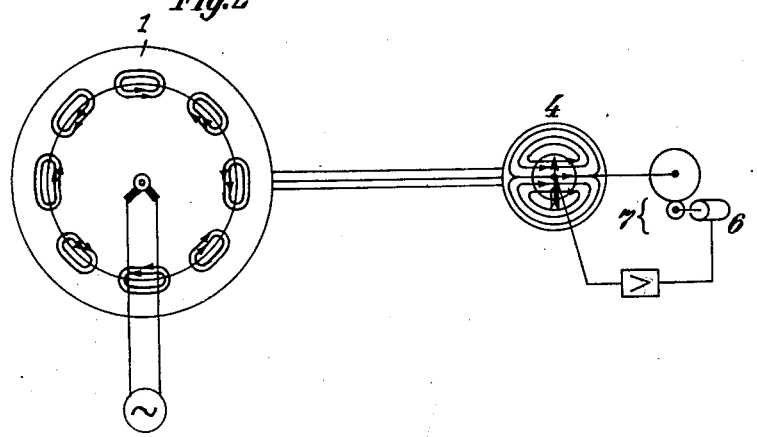
Fig. 2 shows diagrammatically the sender and the receiver per se, the pairs of poles being diagrammatically indicated.

The sender 1 is provided with a number of pairs of poles which is a multiple of that of the receiver 4. This is diagrammatically illustrated in Fig. 2 in which the sender 1 has four pairs of poles while the receiver 4 has but one pair of poles. This has the effect that the secondary fields set up in the receiver rotate at a higher speed than the sender the speeds being in the same ratio as the numbers of the pairs of poles of the two cooperaitng transmitting units. By rendering the ratio of the pairs of poles equal to the ratio of transmission of the gearing 9, I obtain the same effect as though the receiver 4 were directly mounted on the shaft of the search light and were driven by the motor 6 through the gearing 9, except that my improved arrangement is immune from hunting.

The alternating field set up in the receiver by the currents transmitted thereto from the sender partakes in any rotary motion to which the sender rotor is subjected but turns through a large angle corresponding to the ratio of transmission. The receiver rotor is automatically adjusted by the electric servomotor corresponding to such secondary field. This servomotor is controlled through the amplifier by the voltage induced by the secondary field in the receiver, whereby the servomotor tends at any time to restore the receiver rotor to a position in which the plane of the rotor winding is positioned within the direction of the secondary field and in which the motor-controlling voltage induced therein will attain zero.

In order to secure strict proportionality of the angular motions performed by the sender and the receiver, the E. M. F. of the transformation of the sender must comply with the requirement that its effective value in any phase winding change in dependence of the angle of rotation of the sender in accordance with a characteristic conforming as closely as possible to a sinoidal curve. A similar requirement exists in synchronous alternating current generators in which the characteristic of the voltage of the produced current shall conform to a sinoidal curve. Therefore, it could be attempted in the present case to use the same measures as there, for instance, the measure of distributing a plurality of conductors coordinated to one phase and one pole over a corresponding number of notches (multiple hole winding) and to specially profile the pole shoes so as to secure a sinoidal distribution of the flux. In the present case, these measures are not applicable, however, if a large ratio of transmission is desired. For, if the total number of conductors of the phase windings would amount to a multiple of the number of poles, an excessively large diameter of the machine would result. In order to reduce the diameter of the sender, the pole pitch must be made as small as possible. Therefore, but a single notch may be provided per pole pitch. With the provision of a single conductor per pole pitch it is impossible, however, to secure a sinoidal change of the E. M. F. produced in any individual conductor in dependence of the rotation of the sender rotor or to accommodate a polyphase winding. In order to obtain a high ratio of transmission between the sender and the receiver, I make the pole pitch of the primary sender winding energized with monophase current slightly different from the notch pitch of the secondary polyphase winding of the sender. Owing to such arrangement, the conductors arranged in series and constituting the elements of the polyphase winding are so positioned in the different pole fields inducing them simultaneously as to assume differential positions therein. Owing to such differences in position, the deviation from the sinoidal characteristic of the voltages induced in the individual conductors is equalized by the accumulation of such individual voltages.

This will be explained in detail hereinafter with reference to Figs. 3 and 4. Fig. 3 shows a cross-section through the sender diagrammatically developed along a straight line.

Figure 8:
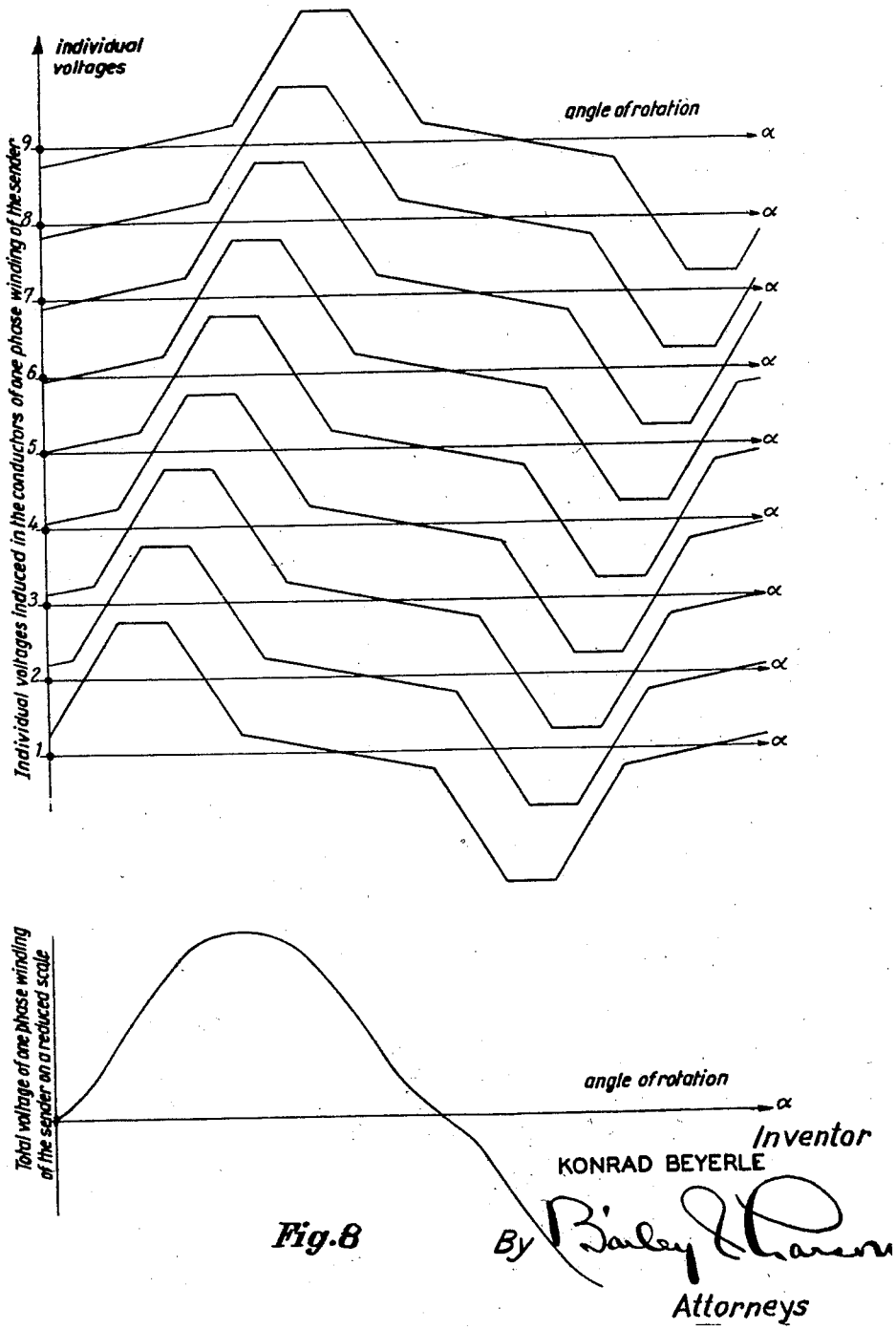
Fig. 8 illustrates the characteristics of the individual voltages induced in the winding elements and of the accumulative voltage thereof having a nearly sinoidal character.

The stator 10 of the sender surrounding the rotor thereof illustrated in Fig. 3 is provided with a plurality of circumferentially distributed notches or holes H. Within these notches or holes conductors 12 extend parallel to the axis of the rotor, that is to say, at right angles to the plane of movement of the poles. These conductors 12 are interconnected so as to constitute an open wave-shaped single-notch winding in the manner indicated in Fig. 4, in which the conductors 12 are diagrammatically shown by full lines, the rest of the stator being omitted in Fig. 4. The poles of the rotor constituting the primary element of the rotary transformer are energized with monophase alternating current in such a manner that they have alternate opposite polarities indicated in Fig. 4 by "S" meaning south pole and by "N" meaning north pole. The pole pitch of the rotor indicated at $p$ differs slightly from the pitch $a$ of the notches. In the embodiment of my invention illustrated in Figs. 3 and 4, 11 rotor poles correspond to 10 stator notches. The stator winding which is a simple single-groove winding surrounds the stator teeth in a wave-like manner as shown in Fig. 4. As the stator notch pitch differs slightly from the rotor pole pitch, the winding elements 12 arranged in series assume differential positions in the different rotor pole fields inducing them simultaneously. Thus, for instance, the conductor No. 1 is located opposite to the left edge of a north pole while the conductor No. 3 is positioned farther towards the center of the field of the coordinated north pole. The conductor No. 5 is in accurate registry with the center of the north pole, and so forth. Owing to this differential position of the conductors 12 in the different rotor pole fields, different voltages are induced therein which accumulate to form the total voltage between the tappings A and E. In Fig. 8 at the bottom thereof, I have shown the characteristic of the total voltage between the tappings A and E in dependence of the angle of rotation of the rotor. It will be seen that this characteristic is nearly a true sinus curve. Above this characteristic I have shown the characteristics of the individual voltages induced in dependence of the angle of rotation α of the rotor in nine consecutive conductors. It will appear that any individual voltage varies in accordance with a characteristic which differs considerably from a sinus curve. The nearly sinoidal characteristic of the total voltage is obtained by adding the individual voltages and by reducing the scale of the ordinates thereof.

Thus it will appear that the improved effect is based on the interference of the rotor pole pitch with the stator notch pitch. This interference has the effect that in the individual winding elements arranged in series different voltages are induced which, when added together, result in a total voltage having a characteristic approaching closely a sinus curve. The principle of my invention illustrated in Figs. 3 and 4 may be embodied in various forms of the sender some of which will be described hereinafter.

The difference of the numbers of the stator notches and the rotor poles amounts preferably to but a small fraction of the number of pairs of poles, preferably to one or two.

A closed single-notch winding may be used if the number of notches is made $2p\pm2$ wherein $p$ is the number of pairs of rotor poles. A sender of this type is illustrated in Fig. 5. In this figure, the number of rotor poles amounts to 34 and the number of stator notches to 36. The rotor winding energized by monophase alternating current has been omitted for sake of a simplified illustration. The single-notch winding positioned within the notches of the stator is so mounted as to surround the stator teeth in a wave-like manner.

Figure 6:
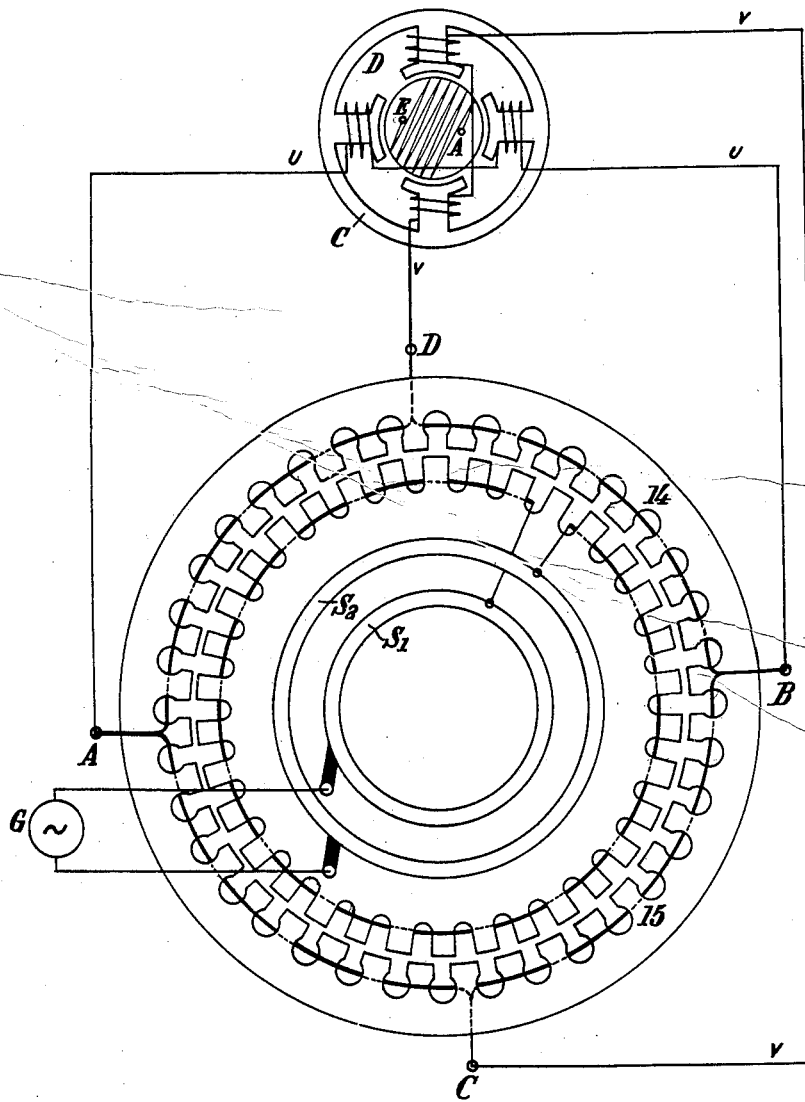
Fig. 6 shows a sender provided with a winding having two-phase tappings and shows a two-phase receiver.

The addition of the voltages induced in the individual winding elements shows that the highest voltage difference existing in the winding occurs between two diametrically opposite points, for instance between A and B or C and D. If these points in which the stator winding is tapped, are positioned as shown in Figs. 5 and 6, the stator winding corresponds to a two-phase winding in which four lines are required to establish the connection with the receiver.

The rotor carrying the primary winding of the rotary transformer is equipped with a simple wave-winding to which monophase alternating current derived from the source G is supplied through the collector rings S₁ and S₂ and brushes cooperating therewith.

The receiver is comprised of a two-phase stator C and of a rotor having but a single coil the axis of which is diametrically disposed and the terminals E, A of which are connected with the input circuit of the amplifier controlling the electric motor not shown herein. One of the phase windings of the stator C is connected to the terminals A, B of the sender by the conduits or lines $u$, whereas the other phase winding of the receiver stator is connected to the terminals C, D of the sender by the lines $v$. If the sender rotor assumes such a position that the maximum voltage exists between the terminals A and B while the voltage between the terminals C and D disappears, the magnetic field produced in the stator of the receiver has a vertical direction with regard to the drawings. Therefore, the receiver rotor will be so turned by the motor connected therewith as to position the axis of its winding transversely to this field. If, however, starting from this position the sender rotor is turned half of one pole pitch, the maximum voltage will exist between the terminals C and D, whereas the voltage between the terminals A and B disappears. Consequently, the secondary field set up in the receiver stator is positioned horizontally with regard to the drawings. Hence, this secondary field has turned through 90 degrees. Therefore, one complete revolution of the receiver corresponds to a turn of the sender through two pole pitches. Since the sender rotor has 34 poles in the present example, the ratio of transmission is 1:17.

I may obtain a very accurate sinoidal characteristic of the change in voltage by reducing the difference of the number of stator notches from the number of rotor poles to but 1. This means that with a sender rotor having 17 pairs of poles, the number of notches in the stator must be 33 or 35.

Figure 7:
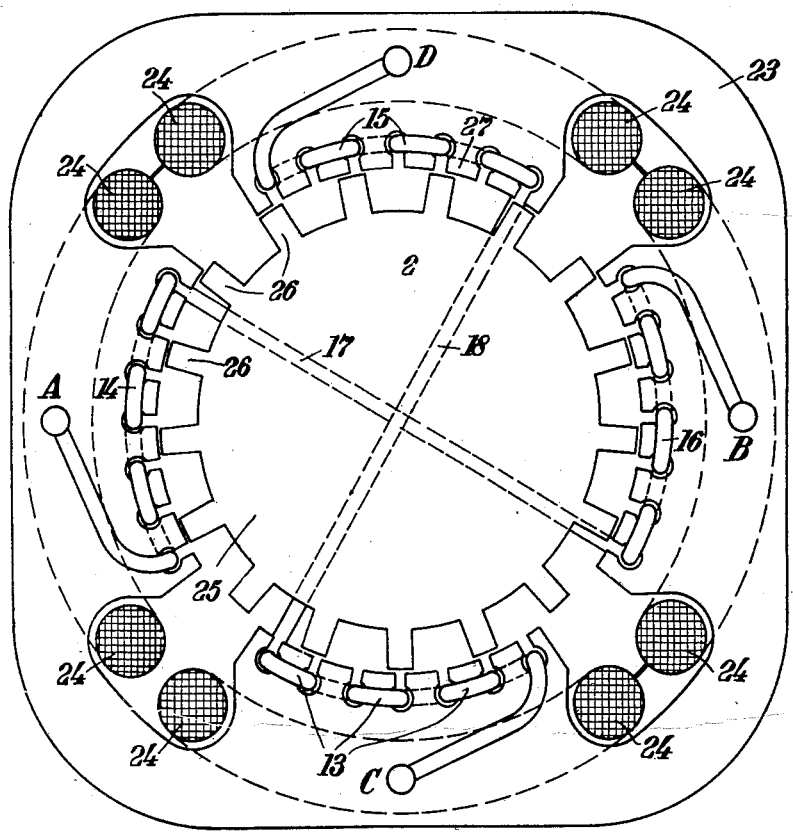
Fig. 7 depicts a sender provided with two separate phase windings and with energizing coils provided on the stator for producing the pole fluxes through the rotor.

Fig. 7 illustrates my invention applied to another type of sender. In this sender, the internally notched stator 23 carries energizing coils 24 supplied with monophase alternating current in addition to the polyphase winding located within the notches. Four such energizing coils 24 are provided arranged in series. Each coil 24 surrounds one group of stator poles or teeth and sets up a magnetic flux flowing through the inner rotor 25. This rotor is free from any winding. It consists of toothed sheet metal plates the teeth 26 of which constitute the rotor poles each tooth being the equivalent of one pole pair. In rotation of the rotor these poles confront alternately odd and even stator teeth 27. When the rotor rotates, the changes of the magnetic flux occurring in the teeth 27 occasion a change in the alternating voltage produced in the stator winding 28. The winding 28 again surrounds the stator teeth 27 in a wave-like manner.

It is to be observed that it is not necessary for the optimal compensation of the departure of the individual characteristic from a sinus curve, that the group of individual conductors arranged in series extend over the entire range of the voltage difference between A and E as it is the case in Figs. 4 and 5. A much smaller difference of the individual voltages induced in the first and the last conductor of each group or branch is sufficient for practical purposes. Therefore, in lieu of a closed annular winding, a winding composed of plural pairs of opposite groups of conductors may be provided, each pair constituting one phase winding in that the conductors of each group are arranged parallel or in series. This is shown in Fig. 7. The stator winding is subdivided in four groups of winding elements designated with 13, 14, 15 and 16. The groups 14 and 16 are arranged in series by cross-connections 17 and are connected to the terminals A and B. Similarly, the windings 13 and 15 are connected by cross-connectors 18. This phase winding is connected to the terminals C and D. In this manner, two phase windings are obtained. Also, in this instance, the pitch of the stator notches differs slightly from half the pitch of the teeth 26. The number of teeth 26 amounts to 17. The pitch of the stator notches is so chosen that including the teeth omitted for the cavities containing the coils 24 thirty-six will be counted. In the embodiment of Fig. 7, each pale 26 stands for a pair of poles compared with the function in the preceding figures. Therefore, if the number of poles 26 in Fig. 7 is $p$, the number of stator notches accommodating the polyphase winding will be found by the formula $2p\pm q$ in which $q$ is very small compared with $2p$.

Even though the two relatively rotatable sender elements have been referred to hereinbefore as "stator" and "rotor", it is obvious that the invention is equally applicable to senders of the type in which the constituent energized with monophase alternating current is stationary while the constituent carrying the polyphase winding is rotatable. Similarly, either one of the two constituents may be mounted on the outside so as to surround the other one.

The term "polyphase winding" as used hereinabove includes a two-phase winding, a three phase winding and so forth, as distinguished from the monophase winding.

Further modifications of my invention will readily occur to anyone skilled in the art. Therefore, it is to be understood that the invention is not limited to the exact embodiments as described hereinbefore.

What I claim is:

1. System for the electrical transfer of rotary motion comprising a sender and a receiver both of the rotatable transformer type composed of a stator and a rotor, electrical conduits connecting said sender with said receiver, an electric motor controlled by said receiver and directly connected with the rotor thereof, said sender and said receiver constituting an electrical speed change transmission in which a partial revolution of the sender causes the receiver to perform one complete revolution.

2. System for the electrical transfer of rotary motion comprising a sender and a receiver, each composed of two relatively rotatable elements constituted by a stator and by a rotor, of a primary winding on one of said elements, and of a plurality of secondary windings mounted on the other one of said elements, means connecting said primary winding of said sender to a source of alternating current enabling said primary winding to variably induce said secondary windings depending on the angular position of the rotor of said sender, electrical conduits connecting the secondary windings of said sender with the secondary windings of said receiver, an electric motor controlled by the primary winding of said receiver and mechanically connected to the rotor thereof and operative to rotate the same to a position in which the voltage induced by the secondary windings of the receiver within said primary winding thereof becomes zero, the number of windings of said receiver being a small fraction of the number of windings of said sender, whereby the rotor of said receiver will be turned by said motor one complete revolution in response to a turn of the rotor of said sender through a small angle.

3. System for the electrical transfer of rotary motion comprising a sender and a receiver, each composed of two relatively rotatable elements constituted by a stator and by a rotor, of poles on said elements, of a primary pole winding on one of said elements, and of a plurality of secondary pole windings mounted on the other one of said elements, means connecting said primary winding of said sender to a source of alternating current enabling said primary winding to variably induce said secondary windings depending on the angular position of the rotor of said sender, electrical conduits connecting the secondary windings of said sender with the secondary windings of said receiver, an electric motor controlled by the primary winding of said receiver and mechanically connected to the rotor thereof and operative to rotate the same to a position in which the voltage induced by the secondary windings of the receiver within said primary winding thereof becomes zero, the number of poles of said receiver being a small fraction of the number of poles of said sender, whereby the rotor of said receiver will be turned by said motor one complete revolution in response to a turn of the rotor of said sender through a small angle.

4. System for the electrical transfer of rotary motion comprising a sender and a receiver, both of the rotatable transformer type composed of two elements constituted by a stator and a rotor, electrical conduits connecting said sender with said receiver, an electric motor controlled by said receiver and directly connected with the rotor thereof, said sender and said receiver constituting an electrical speed change transmission in which a partial revolution of the sender causes the receiver to perform one complete revolution, said sender elements being each provided with a multiplicity of poles and having pole pitches differing from one another by a fraction of one pole pitch, a single-phase winding on one of said elements connected with a source of alternating current, and a multiple-phase winding on the other one of said elements, whereby successive elements of said multiple-phase winding will be differentially positioned in different pole fields of said single-phase winding.

5. System for the electrical transfer of rotary motion comprising a sender and a receiver, both of the rotatable transformer type composed of two elements constituted by a stator and a rotor, electrical conduits connecting said sender with said receiver, an electric motor controlled by said receiver and directly connected with the rotor thereof, said sender and said receiver constituting an electrical speed change transmission in which a partial revolution of the sender causes the receiver to perform one complete revolution, said sender elements being each provided with a multiplicity of poles, the number of poles of one of said sender elements differing from the number of poles of the other one of said sender elements by two, a single-phase winding on one of said elements connected with a source of alternating current, and a multiple-phase winding on the other one of said elements, whereby successive elements of said multiple-phase winding will be differentially positioned in different pole fields of said single-phase winding.

6. System for the electrical transfer of rotary motion comprising a sender and a receiver, both of the rotatable transformer type composed of two elements constituted by a stator and a rotor, electrical conduits connecting said sender with said receiver, an electric motor controlled by said receiver and directly connected with the rotor thereof, said sender and said receiver constituting an electrical speed change transmission in which a partial revolution of the sender causes the receiver to perform one complete revolution, said sender elements being each provided with a multiplicity of poles and having pole pitches differing from one another by a fraction of one pole pitch, a single-phase winding on one of said elements connected with a source of alternating current, and a closed multiple-phase one-groove winding on the other one of said elements provided with diametrically opposed tappings connected to said electrical conduits leading to said receiver, whereby successive elements of said closed multiple-phase winding will be differentially positioned in different pole fields of said single-phase winding.

7. System for the electrical transfer of rotary motion comprising a sender and a receiver, both of the rotatable transformer type composed of two elements constituted by a stator and a rotor, electrical conduits connecting said sender with said receiver, an electric motor controlled by said receiver and directly connected with the rotor thereof, said sender and said receiver constituting an electrical speed change transmission in which a partial revolution of the sender causes the receiver to perform one complete revolution, said sender elements being each provided with a multiplicity of poles and having pole pitches differing from one another by a fraction of one pole pitch, a single-phase winding on one of said elements connected with a source of alternating current, a multiple-phase winding on the other one of said elements composed of plural pairs of opposite groups of conductors, the groups of each pair constituting one phase of the multiple-phase winding, whereby successive conductors of said multiple-phase winding will be differentially positioned in different pole fields of said single-phase winding.

8. System for the electrical transfer of rotary motion comprising a sender and a receiver both of the rotatable transformer type composed of a stator and a rotor, electrical conduits connecting said sender with said receiver, an electric motor controlled by said receiver and directly connected with the rotor thereof, said sender and said receiver constituting an electrical speed change transmission in which a partial revolution of the sender causes the receiver to perform one complete revolution, the stator and the rotor of said sender being provided with a plurality of poles, the pole pitch of said rotor differing from that of said stator, coils on said stator energized by a single-phase alternating current adapted to produce a flux through the poles of said rotor and a multiple-phase winding on said stator and connected with said electrical conduits leading to said receiver.

KONRAD BEYERLE.